United States Patent [19]

Hewitt

[11] 4,185,952
[45] Jan. 29, 1980

[54] MOULDING MACHINES
[75] Inventor: Malcolm Hewitt, Aldridge, England
[73] Assignee: British Industrial Plastics Ltd., Manchester, England
[21] Appl. No.: 934,112
[22] Filed: Aug. 16, 1978
[30] Foreign Application Priority Data
Aug. 24, 1977 [GB] United Kingdom ............. 35478/77
[51] Int. Cl.² .............................................. B29F 1/06
[52] U.S. Cl. ..................................... 425/149; 425/150; 425/405 R; 425/DIG. 60
[58] Field of Search ...... 425/405 R, 405 H, DIG. 60, 425/149, 150; 264/102

[56] References Cited
U.S. PATENT DOCUMENTS

| 2,876,492 | 3/1959 | Grieder et al. | 425/405 |
| 3,103,698 | 9/1963 | Wollett | 425/405 X |
| 3,267,517 | 8/1966 | Altermatt | 425/DIG. 60 |
| 3,351,983 | 11/1967 | Grigull | 264/102 X |
| 3,555,620 | 1/1971 | Bucy | 425/149 |
| 3,689,186 | 9/1972 | Winter | 425/405 R X |
| 3,894,824 | 7/1975 | Wells | 425/150 X |

Primary Examiner—J. Howard Flint, Jr.
Attorney, Agent, or Firm—William Anthony Drucker

[57] ABSTRACT

An injection molding machine has a fixed and a tool portion, a shroud mounted for sliding movement around and in sealing relation to one of said portions towards and into sealing engagement with the other portion so as to define with the portions a substantially closed chamber around a molding tool associated with said portions together with means operable to urge said shroud into said sealing engagement and means for at least partially evacuating the closed chamber.

8 Claims, 3 Drawing Figures

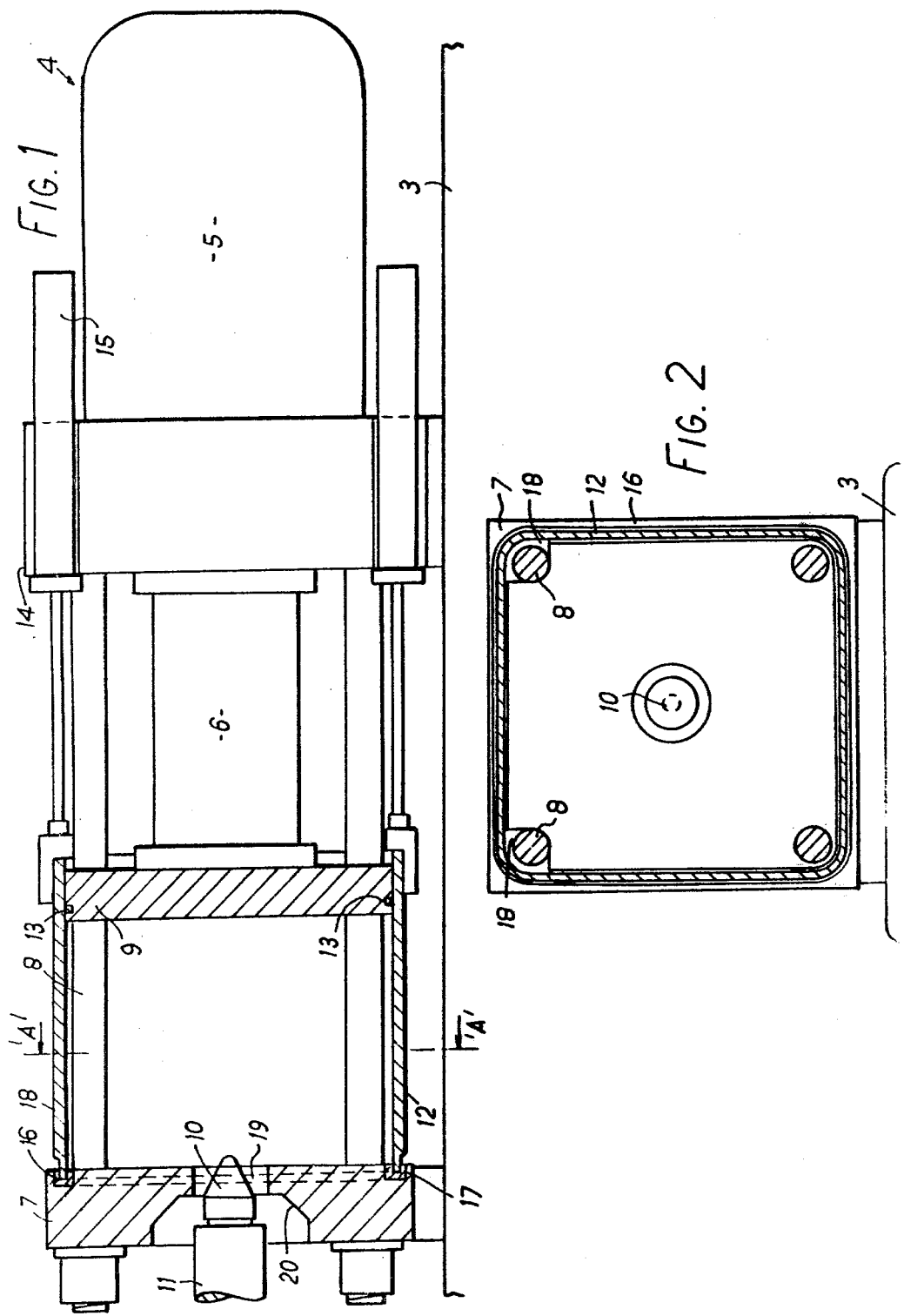

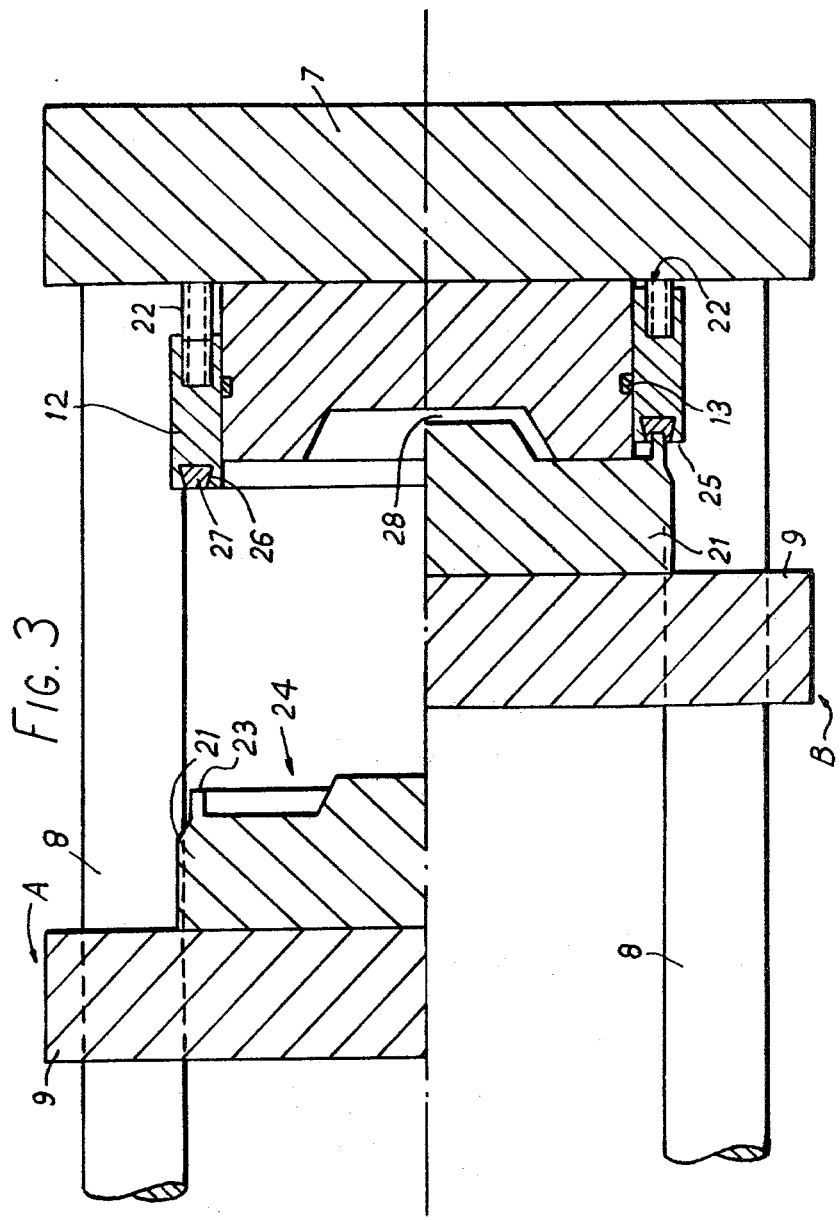

MOULDING MACHINES

This invention relates to injection moulding machines and in particular to injection moulding machines capable of being used to mould materials which tend to release air and/or volatiles in gaseous or vapour form when subjected to heat and pressure. For example, the injection moulding of rubbers and some thermoset resin materials is made difficult by virtue of air trapped in the mould and/or volatiles evolved in the vulcanizing and/or curing process.

Attempts to deal with trapped air and/or these volatile products of the moulding process have included enclosing the moulding tool in a box formed by an arrangement of fixed and movable sidewalls, together with resilient seals to render the box substantially gas-/vapour tight and thereby enable it to be evacuated at will. Apart from mechanical complexity, problems have arisen over premature failure of the resilient seals used. It is an object of the present invention to provide improved seal life and reduce mechanical complexity.

According to the present invention, an injection moulding machine has a fixed and a tool portion, a shroud mounted for sliding movement around and in sealing relation to one of said portions towards and into sealing engagement with the other portion so as to define with the portions a substantially closed chamber around a moulding tool associated with said portions together with means operable to urge said shroud into said sealing engagement and means for at least partially evacuating the closed chamber.

The fixed and moving tool portions may be constituted by the fixed and movable halves of the tool itself, or they may be constituted by the fixed and moving platens on which the respective tool halves are received and supported. Both constructions are equally feasible and both will be particularly described later in relation to the drawings, although, for simplicity the immediately following text refers only to the second construction, in which the fixed and moving tool portions are constituted by the fixed and moving platens, respectively. It follows that all references to "platens" should be read as including "portions," as appropriate.

Preferably, the shroud is arranged to slide around the moving platen, a continuous piston seal being provided around the margin of the latter, the fixed platen having a face seal disposed to meet the opposed face of the shroud. Conveniently, the shroud is supported by the main tie bars of the moulding machine when presented to the fixed platen and is operated by at least one pneumatic or hydraulic ram, preferably of the double-acting kind. Advantageously, at least two rams are provided and disposed to apply pressure evenly around the periphery of the shroud. Where hydraulic rams are employed, they are preferably operated by the machine hydraulic system and we prefer that their operation be controlled by the machine control system, particularly where the latter is programmable to operate the machine substantially automatically.

It will be understood that for a closed chamber to be formed on sliding the shroud against a platen, both platens must be made impervious, for example, by blanking-off or fitting seals to all the ejector holes. It is also important to note that the mould itself must be closed off by the injection nozzle to prevent leakage through the fixed platen into the chamber. An auxiliary seal may be provided around the nozzle opening in the platen to ensure this.

Because the shroud slides independantly of and around one platen, it is possible to actually separate the moulding tool halves without opening the closed chamber. It is therefore possible to allow a moulding to "breathe," i.e. to release evolved volatiles into the chamber; an at least partial vacuum developed in the chamber will facilitate this release.

Because only two simple seals are used, one of which is a butt or face seal and the other an enclosed, piston seal the risk of damage to either is minimal. Neither seal has to resist abrasion caused by engagement with sharp edges, the face seal in particular is easy to inspect for wear and to replace, if necessary.

Advantageously, at least one platen can be heated and we prefer to use induction heating for this purpose because conventional cartridge heaters are unreliable, especially under vacuum. Induction heating is essentially independant of the atmosphere within the closed box. We have found that leakage through the holes used for connecting electrical power cables to the induction heating coils requires the holes to be sealed. Differential expansion makes this impracticable, but we have found that simple wrapping of the cables with a heat resistant fabric tape, such as asbestos, plus the use of mineral insulated cable joints, reduces leakage to an entirely acceptable level. Preferably the cable ends are sealed, for example, by melting glass into them to prevent leakage through the cable sheath.

In order that the invention be better understood one preferred embodiment of it will now be described by way of example with reference to the accompanying drawings in which FIG. 1 is a schematic side view, partly in section, through the clamp assembly of an injection moulding machine, and FIG. 2 is a section on line AA of FIG. 1.

FIG. 3 is a schematic side view similar to FIG. 1, partly in section, of an alternative construction of part of the clamp area of an injection moulding machine.

In FIGS. 1 and 2 a bedplate 3 carries the main ram assembly 4 of the machine, comprising a cylinder 5 and a ram 6. The cylinder is connected to a fixed platen 7 by four tie bars 8, of which only two are seen in FIG. 1. Slidably mounted on the tie bars is a movable platen 9 attached to the ram 6.

In normal use, the halves of a moulding tool would be mounted on the platens so that operating the main ram assembly 4 would close the tool ready for injection of a material to be moulded through the fixed platen 7 by a nozzle 10. The nozzle 10 is of course mounted on the end 11 of the screw-barrel of the machine; this is conventional and will not be further discussed here.

A one-piece shroud 12 is provided and is slidable over the movable platen 9, a piston seal 13 being provided around the side edges of the latter.

The shroud is connected to a pair of double-acting piston and cylinder devices 14, 15, mounted parallel to the main ram assembly 4.

By operating the devices 14, 15 the shroud can be advanced towards and into contact with the fixed platen 7 which is provided with a co-operating face seal 16 set in a recess 17 in the face of the platen 7.

Referring now to FIG. 2, the shroud is supported on the upper pair of tie bars, when advanced towards the face seal 16, by half bearing shells 18. These are mounted on the tie bars adjacent the fixed platen and serve to accurately locate the shroud against the seal. Because the movable platen 9 slides on the tie bars, it has piston seals let into the walls of the tie bar apertures in the platen to prevent leakage along the tie bars when the shroud is in use. Also provided, but not shown, is a bore through the fixed platen to allow vacuum to be applied when the shroud is in use and in this context, it will be appreciated that when the shroud is in the position of FIG. 1, it defines with the platens a substantially closed chamber within which the mould can be opened and closed under vacuum, as desired and/or as necessitated by the moulding operation to be carried out.

Finally, to minimize leakage around the nozzle 10, the aperture for the latter in the fixed platen 7 has a circumferential seal 19 received in a groove 20.

The foregoing embodiment of the invention has the fixed and moving tool portions constituted by the fixed and moving platens, respectively.

An alternative embodiment will now be described with the aid of FIG. 3, which is a composite view showing both the closed and open states of the moulding tool, the Figure being split along a notional centre line above which the tool is open and below which the tool is closed.

The embodiment of FIG. 3 is generally similar to that shown in FIG. 1 and for convenience like parts bear like numbers, although in the interests of simplicity the bedplate and main vain assembly have been omitted. In the Figure, a fixed platen 7 is mounted on four tie bars 8, in which only two are visible (as in FIG. 1). Slidably mounted on the tie bars is a moving platen 9 shown in two positions. Mounted on the fixed platen 7 is one half 20 of a moulding tool. The other, moving half 21 of the tool is mounted on the moving platen and is shown in two positions, A (tool open) and B (tool closed), exactly as is the platen itself.

Mounted for sliding movement around the tool half 20 is a one-piece shroud 12. A continuous piston seal 13 is provided around the side edges of the tool half 20 and the shroud is displacable away from the face of the fixed platen by a plurality of piston and cylinder devices 22, two only of which are shown. The moving tool half 21 has a peripheral lip 23 extending around the circumference of its face 24; the opposing edge 25 of the shroud 13 has a recess 26 containing a face seal 27. It will be appreciated that this time corresponds to the arrangement previously described in relation to FIGS. 1 and 2. Its operation is identical in that on closing the tool halves (position B), the shroud co-operates with both halves of the tool to form a closed chamber, which completely encloses the mould cavity 28 defined between the halves 20, 21. The piston and cylinder devices 22 serve to urge the face seal of the shroud firmly against the lip 23 and in this embodiment they could be replaced by simple springs, since it is not necessary to slide the shroud as far as in the FIG. 1 embodiment.

What I claim is:

1. An injection moulding machine having a fixed and a moving tool portion, a shroud mounted for sliding movement around and in sealing relation to one of said portions towards and into sealing engagement with the other portion so as to define with the portions a substantially closed chamber around a moulding tool associated with said portions, together with means operable to urge said shroud into said sealing engagement and means for at least partially evacuating the closed chamber.

2. An injection moulding machine according to claim 1 wherein the fixed and moving tool portions are constituted by the fixed and moving halves, respectively, of a moulding tool.

3. An injection moulding machine according to claim 1 wherein the fixed and moving tool portions are constituted by the fixed and moving platens, respectively, of the machine.

4. An injection moulding machine according to any one of claims 1, 2 or 3, wherein the shroud is disposed to slide around the fixed tool portion.

5. An injection moulding machine according to claim 4 wherein a continuous piston seal is provided around the margin of the moving tool portion and the fixed tool portion has a face seal disposed to meet the opposed face of the shroud.

6. An injection moulding machine according to claim 1, wherein the means operable to urge the shroud into sealing engagement with the other tool portion is a piston and cylinder device.

7. An injection moulding machine according to claim 1, wherein at least one tool portion includes induction heating means.

8. An injection moulding machine according to claim 1, including a hydraulic system for operating the machine and a machine control system therefore arranged to operate the machine and the shroud substantially automatically.

* * * * *